(12) United States Patent
Hong et al.

(10) Patent No.: US 11,537,295 B2
(45) Date of Patent: Dec. 27, 2022

(54) MEMORY SYSTEM AND METHOD OF OPERATING THE MEMORY SYSTEM

(71) Applicant: SK hynix Inc., Icheon-si (KR)

(72) Inventors: Yong Hwan Hong, Icheon-si (KR); Byung Ryul Kim, Icheon-si (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 0 days.

(21) Appl. No.: 17/201,422

(22) Filed: Mar. 15, 2021

(65) Prior Publication Data

US 2022/0075531 A1   Mar. 10, 2022

(30) Foreign Application Priority Data

Sep. 9, 2020   (KR) .................. 10-2020-0115680

(51) Int. Cl.
G06F 3/06      (2006.01)
G06F 1/30      (2006.01)
G06F 11/14     (2006.01)

(52) U.S. Cl.
CPC .............. *G06F 3/0619* (2013.01); *G06F 1/30* (2013.01); *G06F 3/0652* (2013.01); *G06F 3/0656* (2013.01); *G06F 3/0679* (2013.01); *G06F 11/1469* (2013.01)

(58) Field of Classification Search
CPC ........ G06F 3/0619; G06F 1/30; G06F 3/0652; G06F 3/0656; G06F 3/0679; G06F 11/1469; G06F 11/1441
See application file for complete search history.

(56) References Cited

U.S. PATENT DOCUMENTS

2020/0233739 A1 * 7/2020  Oh ..................... G06F 3/0679
2020/0371571 A1 * 11/2020 Kojima ............... G06F 12/0246

FOREIGN PATENT DOCUMENTS

KR    1020160087426 A   7/2016
KR    1020190125026 A   11/2019

\* cited by examiner

*Primary Examiner* — David Yi
*Assistant Examiner* — Dustin B. Fulford
(74) *Attorney, Agent, or Firm* — William Park & Associates Ltd.

(57) ABSTRACT

The present technology relates to a memory device. A memory device according to the present technology includes a memory cell array including a backup block and a data block, a data input/output circuit including a plurality of page buffers that buffer data received from a host, a peripheral circuit configured to perform a program operation of storing the data in the data block, and a backup operation controller configured to control the peripheral circuit to perform a reset operation of stopping the program operation and a backup program operation of storing the data in the backup block when a backup command indicating occurrence of a sudden power off is received from an external controller during the program operation, and the reset operation is an operation of maintaining a state in which the data is buffered in the plurality of page buffers and resetting the peripheral circuit.

20 Claims, 15 Drawing Sheets

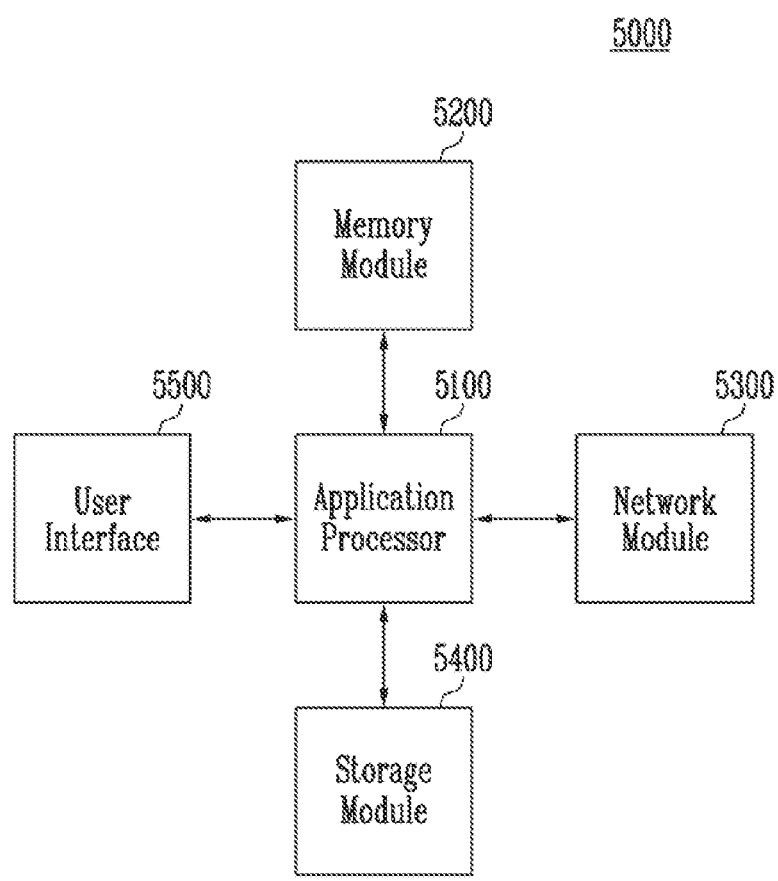

MEMORY SYSTEM AND METHOD OF OPERATING THE MEMORY SYSTEM

CROSS-REFERENCE TO RELATED APPLICATION

The present application claims priority under 35 U.S.C. § 119(a) to Korean patent application number 10-2020-0115680, filed on Sep. 9, 2020, in the Korean Intellectual Property Office, the entire disclosure of which is incorporated herein by reference.

BACKGROUND

1. Technical Field

The present disclosure relates to an electronic device, and more particularly, to a memory system and a method of operating the memory system.

2. Related Art

A memory system is a device that stores data under control of a host device such as a computer or a smartphone. The memory system may include a memory device in which data is stored and a memory controller controlling the memory device. The memory device is divided into a volatile memory device and a non-volatile memory device.

The volatile memory device is a device that stores data only when power is supplied and loses the stored data when the power supply is cut off. The volatile memory device includes a static random access memory (SRAM), a dynamic random access memory (DRAM), and the like.

The non-volatile memory device is a device that does not lose data even though power is cut off. The non-volatile memory device includes a read only memory (ROM), a programmable ROM (PROM), an electrically programmable ROM (EPROM), an electrically erasable and programmable ROM (EEPROM), a flash memory, and the like.

SUMMARY

A memory device according to an embodiment of the present disclosure may include a memory cell array including a backup block and a data block, a data input and output (input/output) circuit including a plurality of page buffers that buffer data received from a host, a peripheral circuit configured to perform a program operation of storing the data in the data block, and a backup operation controller configured to control the peripheral circuit to perform a reset operation of stopping the program operation and a backup program operation of storing the data in the backup block when a backup command indicating occurrence of a sudden power off is received from an external controller during the program operation, and the reset operation may be an operation of maintaining a state in which the data is buffered during the program operation in the plurality of page buffers and resetting the peripheral circuit.

A method of operating a memory device including a backup block and a data block according to an embodiment of the present disclosure may include receiving a backup command indicating occurrence of a sudden power off during a program operation of storing data received from an outside in the data block, performing a reset operation of maintaining a state in which the data is buffered during the program operation in a plurality of page buffers and resetting a peripheral circuit that performs the program operation, and performing a backup program operation of storing the data in the backup block.

A memory system according to an embodiment of the present disclosure may include a memory device including a backup block and a data block, and a memory controller configured to control the memory device, the memory controller may include a sudden power off (SPO) sensor configured to monitor power input from an outside and sense occurrence of a sudden power off, and a central processing unit (CPU) configured to generate a backup command instructing the memory device to store data stored in the data block in the backup block in response to the occurrence of the sudden power off, the memory device may perform a reset operation of stopping a program operation of storing the data in the data block and a backup program operation of storing the data corresponding to the program operation in the backup block when the backup command is received from the memory controller, and the reset operation may be an operation of maintaining the data and resetting the memory device.

BRIEF DESCRIPTION OF THE DRAWINGS

FIG. 16 is a diagram illustrating a user system according to an embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Hereinafter, embodiments of the present disclosure will be described with reference to the accompanying drawings, so that those skilled in the art to which the present disclosure pertains may carry out the technical spirit of the present disclosure.

An embodiment of the present disclosure provides a memory system having an improved sudden power off processing speed, and a method of operating the memory system.

According to the present technology, a memory system having an improved sudden power off processing speed, and a method of operating the same are provided.

Figure 1:
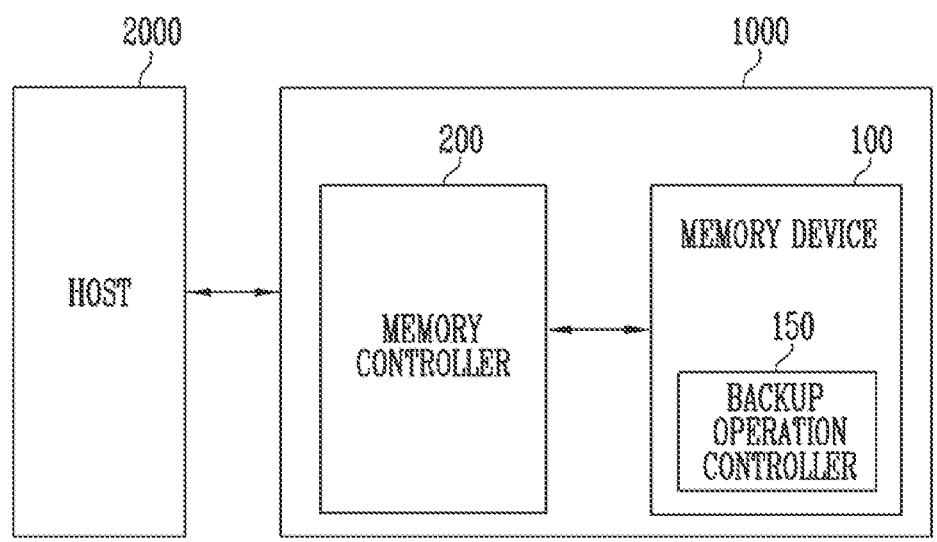
FIG. 1 is a block diagram illustrating a memory system according to an embodiment of the present disclosure.

FIG. 1 is a diagram illustrating a memory system according to an embodiment of the present disclosure.

Referring to FIG. 1, the memory system 1000 may include a memory device 100 and a memory controller 200.

The memory system 1000 may be a device that stores data under control of a host 2000 such as a cellular phone, a smartphone, an MP3 player, a laptop computer, a desktop computer, a game player, a display device, a tablet PC, or an in-vehicle infotainment system.

The memory system 1000 may be it implemented as any one of various types of memory systems according to a host interface that is a communication method with the host 2000. For example, the memory system 1000 may be implemented as any one of various types of memory systems such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The memory system 1000 may be implemented as any one of various types of packages. For example, the memory system 1000 may be implemented as any one of various types of package types, such as a package on package (POP), a system in package (SIP), a system on chip (SOC), a mufti-chip package (MCP), a chip on board (COB), a wafer-level fabricated package (WFP), and a wafer-level stack package (WSP).

The memory device 100 may store data or use the stored data. For example, the memory device 100 may operate in response to control of the memory controller 200. In addition, the memory device 100 may include a plurality of memory dies, and each of the plurality of memory dies may include a memory cell array including a plurality of memory cells storing data.

Each of the memory cells may be configured as a single level cell (SLC) that stores one data bit, a multi-level cell (MLC) that stores two data bits, a triple level cell (TLC) that stores three data bits, or a quad level cell (CLC) that stores four data bits.

The memory cell array may include a plurality of memory blocks. Each memory block may include a plurality of memory cells, and one memory block may include a plurality of pages. Here, a page may be one unit for storing data in the memory device 100 or reading the data stored in the memory device 100.

According to an embodiment of the present disclosure, each of the plurality of memory blocks may be any one of a backup block or a data block. Here, the backup block may store backup operation information indicating whether a sudden power off occurs and whether a backup program operation is performed. In addition, the backup block may be a memory block corresponding to a region preset by the memory device 100 to back up data that is being programmed. In addition, the backup block may be configured of memory cells including the SLC that stores one data bit, and the data block may be configured of memory cells including at least one of the MLC that stores two data bits, the TLC that stores three data bits, or the QLC that stores four data bits.

The memory device 100 may be implemented as a double data rate synchronous dynamic random access memory (DDR SDRAM), a low power double data rate4 (LPDDR4) SDRAM, a graphics double data rate (DDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 may receive a command and an address from the memory controller 200. The memory device 100 may be configured to access a region selected by the received address among the memory cell array. Accessing the selected region may mean performing an operation corresponding to the received command on the selected region. For example, the memory device 100 may perform a write operation (a program operation), a read operation, and an erase operation. Here, the program operation may be an operation in which the memory device 100 writes data to the region selected by the address. The read operation may mean an operation in which the memory device 100 reads data from the region selected by the address. The erase operation may mean an operation in which the memory device 100 erases data stored in the region selected by the address.

According to an embodiment of the present disclosure, the memory device 100 may include a backup operation controller 150. The backup operation controller 150 may be a configuration that performs a backup operation based on a command received from the memory controller 200. For example, when receiving a backup command from the memory controller 200, the backup operation controller 150 may control the memory device 100 to perform the backup operation of performing a reset operation of stopping the program operation and a backup program operation on the backup block.

The memory controller 200 may execute firmware (FW) when power is applied to the memory system 1000. The firmware (FW) may include a host interface layer (HIL) that receives a request input from the host 2000 or outputs a response to the host 2000, a flash translation layer (FTL) that manages an operation between an interface of the host 2000 and an interface of the memory device 100, and a flash interface layer (FIL) that provides a command to the memory device 100 or receives a response from the memory device 100.

The memory controller 200 may receive data and a logical address (LA) from the host 2000, and convert the LA into a physical address (PA) indicating an address of memory cells in which data included in the memory device 100 is to be stored. The LA may be a logical block address (LBA), and the PA may be a physical block address (PBA).

The memory controller 200 may control the memory device 100 to perform the program operation, the read operation, the erase operation, or the like according to the request of the host 2000. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

The memory controller 200 may control the memory device 100 to perform the program operation, the read operation, or the erase operation by itself regardless of the request from the host 2000. For example, the memory controller 200 may control the memory device 100 to perform the program operation, the read operation, or the erase operation used to perform a background operation such as wear leveling, garbage collection, and read reclaim.

According to an embodiment of the present disclosure, when a sudden power off occurs in which power supplied from the outside is cut off, the memory controller 200 may transmit the backup command to the memory device 100 so that the memory device 100 stops the program operation that is being performed and performs the backup program operation. That is, the memory controller 200 may control the memory device 100 to perform the reset operation and the backup program operation using the backup command. In addition, when power is normally supplied after the sudden power off occurs, the memory controller 200 may control the memory device 100 to continue the program operation stopped due to the occurrence of the sudden power off. For example, the memory controller 200 may control the memory device 100 to resume the program operation in progress after the occurrence of the sudden power off by using a resume command.

The host 2000 may communicate with the memory system 1000 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
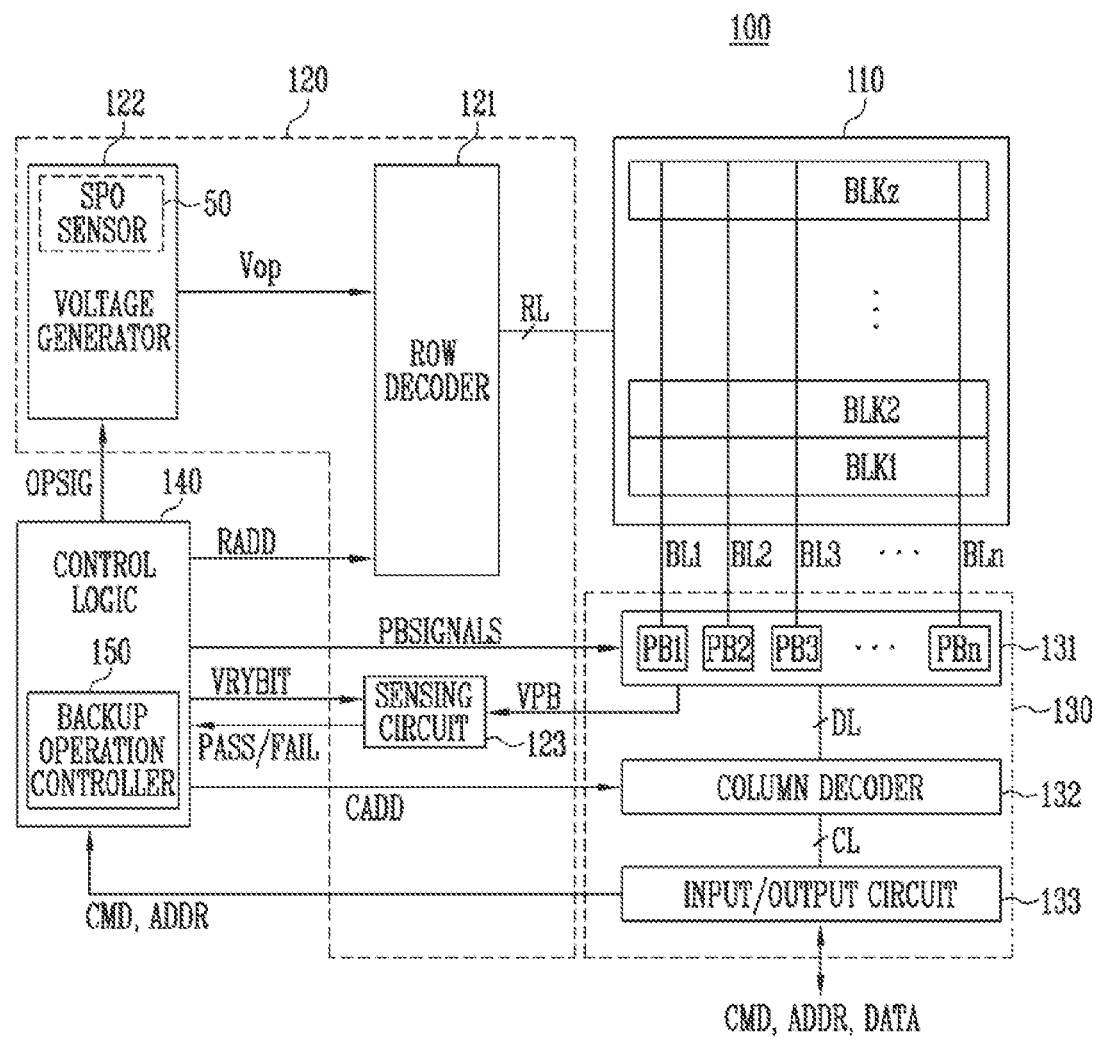
FIG. 2 is a block diagram illustrating a memory device according to an embodiment of the present disclosure.

FIG. 2 is a block diagram illustrating the memory device according to an embodiment of the present disclosure.

Referring to FIG. 2, the memory device 100 may include a memory cell array 110, a peripheral circuit 120, and a data input/output circuit 130.

The memory cell array 110 may include a plurality of memory blocks BLK1 to BLKz. The plurality of memory blocks BLK1 to BLKz may be connected to a row decoder 121 through row lines RL. The plurality of memory blocks BLK1 to BLKz may be connected to a page buffer group 131 through bit lines BL1 to BLn. Each of the plurality of memory blocks BLK1 to BLKz may include a plurality of memory cells. In addition, the plurality of memory cells may be non-volatile memory cells. Memory cells connected to the same word line may be defined as one page. Therefore, one memory block may include a plurality of pages. The row lines RL may include at least one source select line, a plurality of word lines, and at least one drain select line.

Each of the memory cells included in the memory cell array 110 may be configured as an SLC that stores one data bit, an MLC that stores two data bits, a TLC that stores three data bits, or a QLC that stores four data bits.

According to an embodiment of the present disclosure, each of the plurality of memory blocks BLK1 to BLKz may be implemented as any one of the backup block or the data block. Here, the backup block may store the backup operation information indicating whether the sudden power off occurs and whether the backup program operation is performed. In addition, the backup block may be the memory block corresponding to the region preset by the memory device 100 to back up the data that is being programmed. In addition, the backup block may be configured of a plurality of memory cells including the SLC that stores one data bit, and the data block may be configured of a plurality of memory cells including at least one of the MLC that stores two data bits, the TLC that stores three data bits, or the QLC that stores four data bits.

The peripheral circuit 120 may be configured to perform the program operation, the read operation, or the erase operation on the selected region of the memory cell array 110 under control of control logic 140. That is, the peripheral circuit 120 may drive the memory cell array 110 under the control of the control logic 140. For example, the peripheral circuit 120 may apply various operation voltages to the row lines RL and the bit lines BL1 to BLn or discharge the applied voltages under the control of the control logic 140. The control logic 140 may be implemented as hardware, software, or a combination of hardware and software. For example, the control logic 140 may be a control logic circuit operating in accordance with an algorithm and/or a processor executing control logic code.

For example, the peripheral circuit 120 may include the row decoder 121, a voltage generator 122, and a sensing circuit 123.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In addition, the row lines RL may further include a pipe select line.

The row decoder 121 may be configured to operate in response to the control of the control logic 140. The row decoder 121 may receive a row address RADD from the control logic 140. For example, the row decoder 121 may be configured to decode the row address RADD. The row decoder 121 may select at least one of the memory blocks BLK1 to BLKz according to a decoded address. In addition, the row decoder 121 may select at least one word line of the memory block selected to apply the voltages generated by the voltage generator 122 to at least one word line WL according to the decoded address.

For example, during the program operation, the row decoder 121 may apply a program voltage to a selected word line and apply a program pass voltage of a level lower than that of the program voltage to an unselected word line. During a program verify operation, the row decoder 121 may apply a verify voltage to the selected word line and a verify pass voltage higher than the verify voltage to the unselected word line. During the read operation, the row decoder 121 may apply a read voltage to the selected word line and apply a read pass voltage higher than the read voltage to the unselected word line.

In an embodiment, the erase operation of the memory cell array 110 may be performed in a memory block unit. During the erase operation, the row decoder 121 may select one memory block according to the decoded address, and the row decoder 121 may apply a ground voltage to word lines connected to the selected memory block.

The voltage generator 122 may operate in response to the control of the control logic 140. The voltage generator 122 may be configured to generate a plurality of voltages using an external power voltage supplied to the memory device 100. For example, the voltage generator 122 may generate the program voltage, the verify voltage, the pass voltage, the read voltage, the erase voltage, and the like in response to the control of the control logic 140. That is, the voltage generator 122 may generate various operation voltages Vop used for the program, read, and erase operations in response to an operation signal OPSIG.

For example, the voltage generator 122 may generate an internal power voltage by regulating the external power voltage. The internal power voltage generated by the voltage generator 122 may be used as an operation voltage of the memory cell array 110. The voltage generator 122 may generate a plurality of voltages using the external power voltage or the internal power voltage. For example, the voltage generator 122 may include a plurality of pumping capacitors that receive the internal power voltage, and may selectively activate the plurality of pumping capacitors to generate the plurality of voltages, in response to the control of the control logic 140. In addition, the generated voltages may be supplied to the memory cell array 110 by the row decoder 121.

According to an embodiment of the present disclosure, the voltage generator 122 may include a sudden power off (SPO) sensor. The SPO sensor 50 may monitor power input from the outside. For example, an external power voltage input from the outside may be input to the voltage generator 122, and the SPO sensor 50 may monitor the input external power voltage to sense a case where the external power voltage is unexpectedly decreased or cut off. In addition, when the sudden power off is sensed by the SPO sensor 50, the voltage generator 122 may provide an emergency preliminary power in preparation for a sudden decrease or cut off of the external power voltage of the memory device 100.

The sensing circuit 123 may generate a reference current in response to a permission bit signal VRYBIT during a read operation or a verify operation, compare a sensing voltage VPB received from the page buffer group 131 and a reference voltage generated by the reference current, and output a pass signal PASS or a fail signal FAIL.

The data input/output circuit 130 may include the page buffer group 131, a column decoder 132, and an input/output circuit 133.

The page buffer group 131 may include first to n-th page buffers PB1 to PBn. The first to n-th page buffers PB1 to PBn may be connected to the memory cell array 110 through the first to n-th bit lines BL1 to BLn, respectively. In addition, the first to n-th page buffers PB1 to PBn may operate in response to the control of the control logic 140. For example, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage or a current of the bit lines BL1 to BLn during the read or verify operation.

For example, during the program operation, when a program pulse is applied to the selected word line, the first to n-th page buffers PB1 to PBn may transfer data DATA received through the input/output circuit 133 to the selected memory cell through the first to n-th bit lines BL1 to BLn. The memory cells of the selected page may be programmed according to the transferred data DATA. Memory cells of a page selected according to the transferred data DATA may be programmed. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained.

During the program verify operation, the first to n-th page buffers PB1 to PBn may read page data from the selected memory cells through the first to n-th bit lines BL1 to BLn.

During the read operation, the first to n-th page buffers PB1 to PBn may read the data DATA from the memory cells of the selected page through the first to n-th bit lines BL1 to BLn, and output the read data DATA to the input/output circuit 133 under control of the column decoder 132.

During the erase operation, the first to n-th page buffers PB1 to PBn may float the first to n-th bit lines BL1 to BLn.

The column decoder 132 may transfer data between the input/output circuit 133 and the page buffer group 131 in response to a column address CADD. For example, the column decoder 132 may exchange data with the first to n-th page buffers PB1 to PBn through data lines DL, or may exchange data with the input/output circuit 133 through column lines CL.

The input/output circuit 133 may transfer the command CMD and the address ADDR received from the memory controller 200 to the control logic 140, or may exchange the data DATA with the column decoder 132.

The control logic 140 may output the operation signal OPSIG, the row address RADD, the page buffer control signals PBSIGNALS, and the permission bit VRYBIT in response to the command CMD and the address ADDR to control the peripheral circuit 120. In addition, the control logic 140 may determine whether the verity operation for the internal operation is passed or failed in response to the pass signal PASS or the fail signal FAIL.

According to an embodiment of the present disclosure, the control logic 140 may include the backup operation controller 150. In addition, the backup operation controller 150 may control the peripheral circuit 120 to perform the backup operation when the sudden power off occurs. A specific feature of the backup operation controller 150 is described with reference to FIG. 5.

FIGS. 3A to 3D are diagrams illustrating a threshold voltage distribution of memory cells storing at least one data bit. In each graph shown in FIGS. 3A to 3D, a horizontal axis may mean a magnitude of a threshold voltage and a vertical axis may mean the number of memory cells.

Figure 3A:
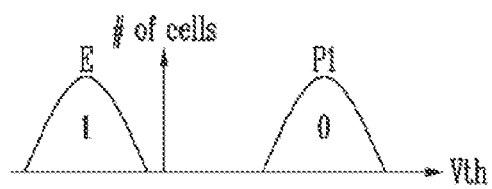
FIG. 3A is a diagram illustrating a single level cell (SLC) in which one memory cell stores one bit of data.

FIG. 3A is a diagram illustrating the SLC in which one memory cell stores one bit of data. Referring to FIG. 3A, the SLC may include any one of an erase state E and a program state P1. The SLC having the erase state E may be read as an on cell and may correspond to a logic value '1'. The SLC having the program state P1 may be read as an off cell and may correspond to a logic value '0'.

Figure 3B:
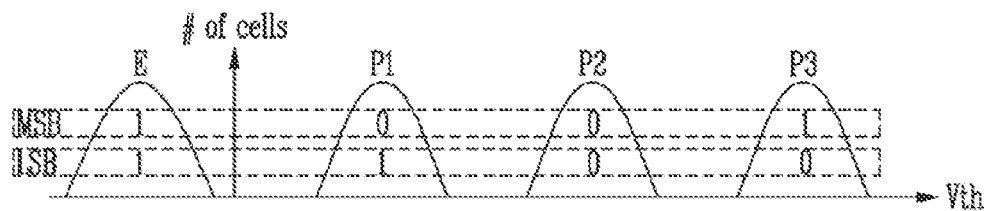
FIG. 3B is a diagram illustrating a multi-level cell (MLC) in which one memory cell stores two bits of data.

FIG. 3B is a diagram illustrating the MLC in which one memory cell stores two bits of data. Referring to FIG. 3B, the MLC may have any one of an erase state E and first to third program states P1 to P3. Each of the erase state E and the first to third program states P1 to P3 may correspond to logical data '11', '01', '00', and '10'. However, the logical data corresponding to each program state is not limited to the present embodiment.

A page storing the most significant bit among the two bits stored by the MLC may be a most significant bit (MSB) page. A page storing the least significant bit among the two bits may be a least significant bit (LSB) page. When programming data in the MLC, after programming LSB page data, MSB page data may be programmed.

Figure 3C:
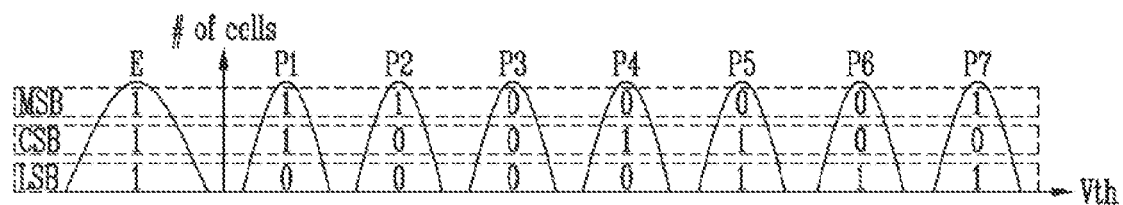
FIG. 3C is a diagram illustrating a triple level cell (TLC) in which one memory cell stores three bits of data.

FIG. 3C is a diagram illustrating the TLC in which one memory cell stores three bits of data. Referring to FIG. 3C, the TLC may have any one of an erase state E and first to seventh program states P1 to P7. Each of the erase state E and the first to seventh program states P1 to P7 may correspond to logical data '111', '110', '100', '000', '010', '011', '001', and '101'. However, the logical data corresponding to each program state is not limited to the present embodiment.

A page storing the most significant bit among the three bits stored by the TLC may be a most significant bit (MS B) page. A page storing an intermediate bit among the three bits may be a central significant bit (CSB) page. A page storing the least significant bit among the three bits may be a least significant bit (LSB) page. When programming data in the TLC, the data may be programmed in an order of LSB page data, CSB page data, and MSB page data.

Figure 3D:
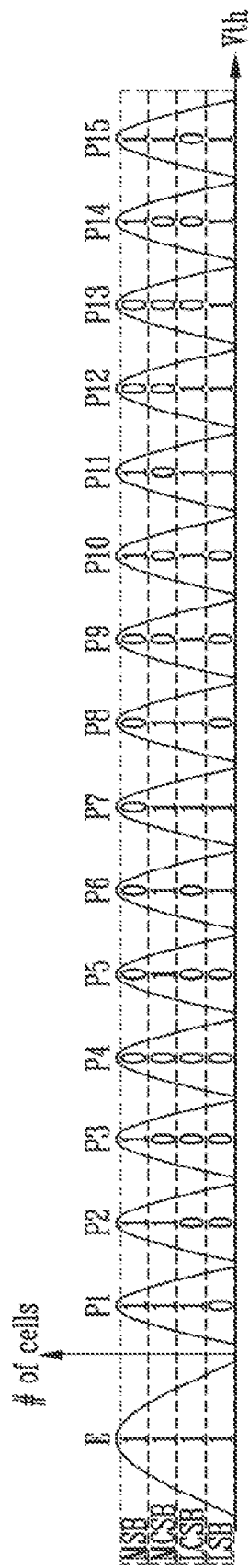
FIG. 3D is a diagram illustrating a quad level cell (QLC) in which one memory cell stores four bits of data.

FIG. 3D is a diagram illustrating the QLC in which one memory cell stores four bits of data. Referring to FIG. 3D, the QLC may have any one of an erase state E and first to fifteenth program states P1 to P15. Each of the erase state E and the first to fifteenth program states P1 to P15 may correspond to logical data '1111', '1110', '1100', '1000', '0000', '0100', '0101', '0111', '0110', '0010', '1010', '1011', '0011', '0001', '1001', and '1101'. However, the logical data corresponding to each state is not limited to the present embodiment.

A page storing the most significant bit among the four bits stored by the QLC may be a most significant bit (MSB) page. A page storing a second priority bit among the four bits may be a most central significant bit (MCSB) page. A page storing a third priority bit among the four bits may be a least central significant bit (LCSB) page. A page storing the least significant bit among the four bits may be a least significant bit (LSB) page. When programming data in the QLC, the data may be programmed an order of LSB page data, LCSB page data, MCSB page data, and MSB page data.

Comparing FIGS. 3A to 3D, as the number of data bits stored by one memory cell increases, the number of program states that may be indicated by one memory cell may increase. As the number of program states that may be indicted by one memory cell increases, the entire width at which a threshold voltage distribution corresponding to each program state is positioned may increase. On the other hand, as the number of program states that may be indicated by one memory cell increases, the width of the threshold voltage distribution corresponding to each program state may decrease. That is, an SLC program operation requires a program time shorter than that of a TLC program operation, and may require power less than that of the TLC program operation. Therefore, in a sudden power off situation in which power and time to perform a program are insufficient, the SLC program operation may be more preferable than the TLC program operation. According to an embodiment of the present disclosure, when the sudden power off situation occurs during the TLC program operation, the backup program operation may be performed by the SLC program operation, thereby protecting data that is in the TLC program operation and preventing an error. According to an embodiment of the present disclosure, when the sudden power off situation occurs during the MLC program operation, the backup program operation may be performed by the SLC program operation, thereby protecting data that is in the MLC program operation and preventing an error. According to an embodiment of the present disclosure, when the sudden power off situation occurs during the QLC program operation, the backup program operation may be performed by the SLC program operation, thereby protecting data that is in the QLC program operation and preventing an error. According to an embodiment of the present disclosure, when the sudden power off situation occurs during the SLC program operation, the backup program operation may be performed by the SLC program operation, thereby protecting data that is in the SLC program operation and preventing an error. According to an embodiment of the present disclosure, when the sudden power off situation occurs during the TLC program operation, the backup program operation may be performed by the SLC program operation without receiving a command from a host 2000, memory controller 200, or any command received externally from the memory device, thereby automatically protecting data that is in the TLC program operation and preventing an error. According to an embodiment of the present disclosure, when the sudden power off situation occurs during the MLC program operation, the backup program operation may be performed by the SLC program operation without receiving a command from a host 2000, memory controller 200, or any command received externally from the memory device, thereby automatically protecting data that is in the MLC program operation and preventing an error. According to an embodiment of the present disclosure, when the sudden power off situation occurs during the QLC program operation, the backup program operation may be performed by the SLC program operation without receiving a command from a host 2000, memory controller 200, or any command received externally from the memory device, thereby automatically protecting data that is in the QLC program operation and preventing an error. According to an embodiment of the present disclosure, when the sudden power off situation occurs during the SLC program operation without receiving a command from a host 2000, memory controller 200, or any command received externally from the memory device, the backup program operation may be performed by the SLC program operation, thereby automatically protecting data that is in the SLC program operation and preventing an error.

Figure 4:
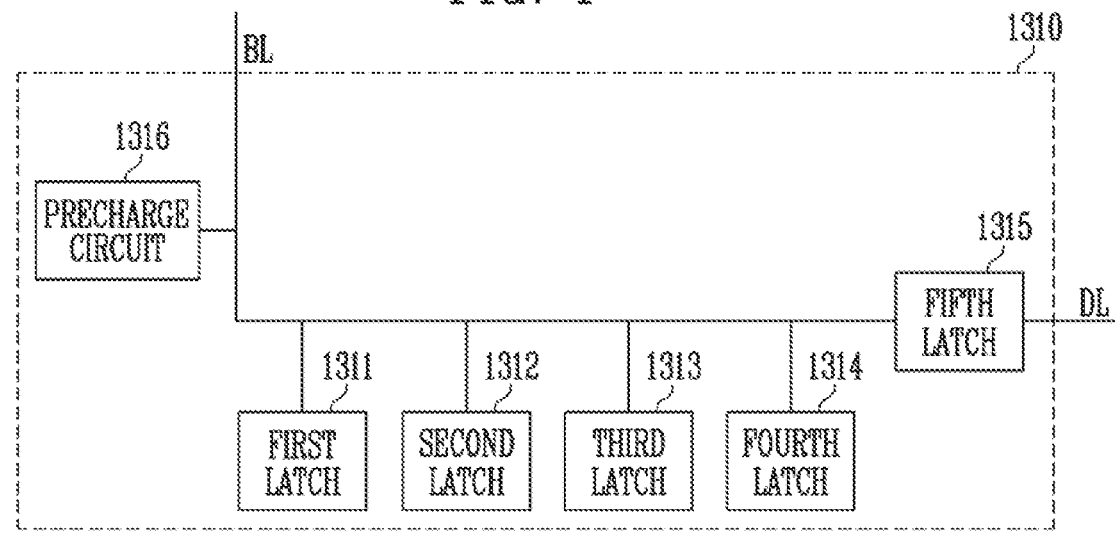
FIG. 4 is a block diagram illustrating a page buffer according to an embodiment of the present disclosure.

FIG. 4 is a block diagram illustrating a page buffer according to an embodiment of the present disclosure.

Referring to FIG. 4, the page buffer 1310 may include a first latch 1311, a second latch 1312, a third latch 1313, a fourth latch 1314, a fifth latch 1315, and a precharge circuit 1316. The page buffer 1230 may be any one page buffer PBi among the plurality of page buffers PB1 to PBn included in the page buffer group 131 shown in FIG. 2.

The page buffer 1310 may be connected to the memory cell array 110 through a bit line BL. The page buffer 1310 may operate in response to the control of the control logic 140 during the program operation. For example, the page buffer 1310 may operate in response to the page buffer control signals PBSIGNALS. The page buffer 1310 may exchange data with the column decoder 132 through the data lines DL.

The first latch 1311 may store precharge data used to determine a voltage at which the bit line is precharged or sensed data sensed from the bit line. In addition, the data sensed from the bit line BL by the first latch 1311 may be transferred to the sensing circuit 123. Here, the sensed data may be the sensing voltage VPB or a sensing current IPB. The sensing circuit 123 may generate the reference current in response to the permission bit signal VRYBIT, compare the sensing voltage VPB received from the page buffer 1310 with the reference voltage generated by the reference current, and output verify information. The verify information may be indicated as the pass signal PASS or the fail signal FAIL by comparing the threshold voltage of the memory cell with the verify voltage.

The second to fourth latches 1312 to 1314 may buffer data to be programmed in a memory cell connected to the bit line BL. That is, the second to fourth latches 1312 to 1314 may temporarily store data received from the host. For example, the second latch 1312 may buffer the LSB data received from the host, the third latch 1313 may buffer the CSB data received from the host. In addition, the fourth latch 1314 may buffer the MSB data received from the host.

Since the fifth latch 1315 is connected to the data line DL, data may be input from an external device (for example, the host). Here, the fifth latch 1315 may be a cache latch that receives the data from the outside. For example, the fifth latch 1315 may sequentially receive the LSB data, the CSB data, and the MSB data from the host. In addition, the data received by the fifth latch 1315 may be moved to the second to fourth latches 1312 to 1314 under the control of the control logic 140. For example, after the LSB data is transmitted from the host to the fifth latch 1315, the LSB data may be moved from the fifth latch 1315 to the second latch 1312 under the control of the control logic 140.

The precharge circuit 1316 may precharge the bit line to any one of a program permission voltage or a program inhibition voltage under the control of the control logic 140.

The backup operation controller 150 according to an embodiment of the present disclosure may control the page buffer 1310 to maintain a state in which the data is buffered in the page buffer 1310 while the backup operation is performed. For example, while the backup operation controller 150 performs the reset operation, the page buffer 1310 may store all of the LSB data, the CSB data, and the MSB data. For example, the second latch 1312 may store the LSB data, the third latch 1313 may store the CSB data, and the fourth latch 1314 may store the MSB data. However, the data stored by each of the second to fourth latches 1312 to 1314 is not limited thereto.

Figure 5:
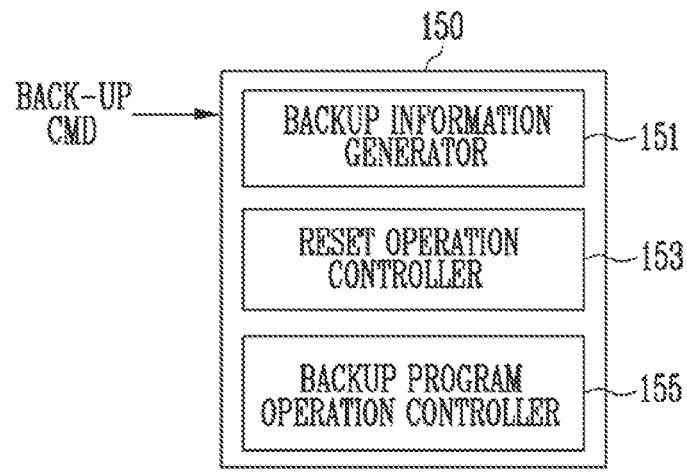
FIG. 5 is a block diagram illustrating a backup operation controller according to an embodiment of the present disclosure.

FIG. 5 is a block diagram illustrating a backup operation controller according to an embodiment of the present disclosure.

Referring to FIG. 5, the backup operation controller 150 may include a backup information generator 151, a reset operation controller 153, and a backup program operation controller 155.

The backup operation controller 150 may be the configuration that performs the backup operation based on the command received from the memory controller 200. For example, when receiving the backup command from the memory controller 200, the backup operation controller 150 may control the memory device 100 to perform the backup operation of performing the reset operation of stopping the program operation and the backup program operation on the backup block. In addition, when receiving the resume command for restarting the stopped program operation from the memory controller 200, the backup operation controller 150 may control the peripheral circuit 120 to perform a backup read operation of reading the data stored in the backup block and a backup erase operation of erasing the data stored in the backup block. Thereafter, the control logic 140 may resume the stopped program operation.

The backup information generator 151 may generate the backup operation information in response to the backup command. For example, when receiving the backup command for controlling to perform the backup operation from the memory controller 200, the backup operation controller 150 may control the peripheral circuit 120 to perform the backup operation, and the backup information generator 151 may generate the backup operation information related to the backup operation. For example, the backup operation information may include information indicating whether the backup operation is performed, information indicating whether the sudden power off is generated, information on data that is a target of the backup program operation, information indicating whether the backup program operation is performed, and the like. The backup operation information may be stored in the backup block together with the data during the backup program operation. In addition, when the external power voltage is normally supplied thereafter, the memory controller 200 may identify that the sudden power off is generated or that the backup operation is performed with reference to the backup operation information received from the memory device 100.

The reset operation controller 153 may control the peripheral circuit 120 to perform the reset operation in response to the backup command. Here, the reset operation may mean an operation of stopping the program operation that is being performed when the backup command is received from an external device (for example, the memory controller 200) while performing the program operation. The reset operation controller 153 may control the page buffer group 131 to maintain the state in which the data is buffered in the page buffer group 131 while the reset operation is performed. For example, the reset operation controller 153 may store all of the LSB data, the CSB data, and the MSB data in the page buffer group 131 while the reset operation is performed. That is, the reset operation controller 153 may control the peripheral circuit 120 so as not to initialize the page buffer group 131, to initialize the remains except for the page buffer group 131, and to stop the program operation that is in progress, in response to the backup command.

The backup program operation controller 155 may control the peripheral circuit 120 to perform the backup program operation in response to the backup command. Here, the backup program operation may be an operation for backing up data on which the program operation is being performed. For example, the backup program operation controller 155 may control the peripheral circuit 120 to perform the backup program operation of storing the data in the backup block in response to the backup command. The backup program operation controller 155 may control the peripheral circuit 120 to perform the backup program operation as a preliminary operation or an emergency operation for the sudden power off. Therefore, the backup program operation controller 155 may control the peripheral circuit 120 to perform the SLC program operation having a high program speed and low power consumption.

Figure 6:
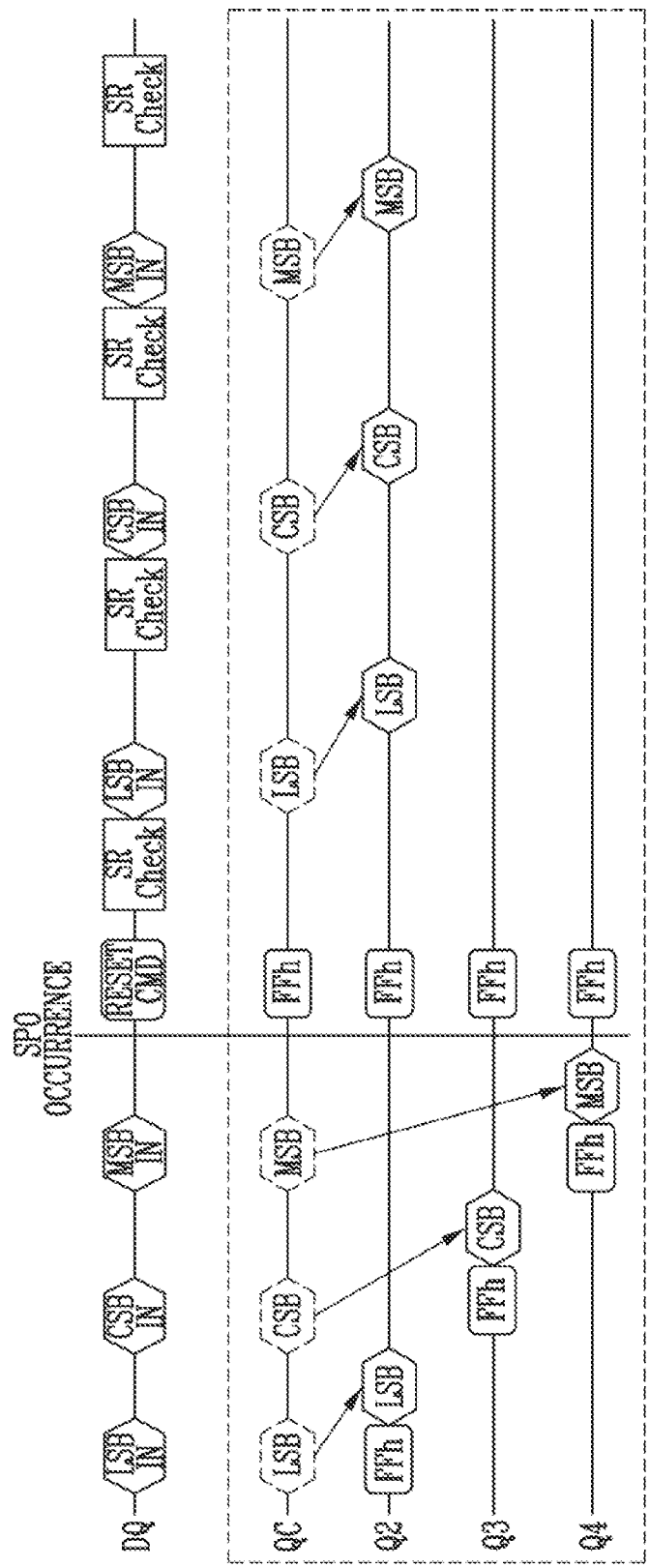
FIG. 6 is a diagram illustrating a method of programming in an SLC program operation during a TLC program operation.

FIG. 6 is a diagram illustrating a method of programming in an SLC program operation during a TLC program operation.

Referring to FIG. 6, an operation of the memory device 100 of a case where the sudden power off occurs during the TLC program operation is shown. First, the memory device 100 may sequentially receive the LSB data, the CSB data, and the MSB data. In the memory device 100, the received data may be first temporarily stored in a cache latch QC, the LSB data may be stored in a second latch Q2, the CSB data may be stored in a third latch Q3, and the MSB data may be stored in a fourth latch Q4.

In addition, when the sudden power off occurs during a program, the memory controller 200 may transmit a reset command RESET CMD (for example, FFh) for stopping an operation that is being performed to the memory device 100. The memory device 100 may stop an internal operation that is being performed and reset the peripheral circuit 120 and the like in response to the reset command. That is, the memory device 100 may reset values of the cache latch QC, the second latch Q2, the third latch Q3, and the fourth latch Q4 in response to the reset command.

In addition, the memory controller 200 may transmit the LSB data when the memory device 100 completes the reset operation. For example, the memory controller 200 may perform a status read polling operation until a ready state of R/B(Read/Busy) is checked. In addition, the memory controller 200 may transmit the LSB data when the memory device 100 is in the ready state. In the status read polling operation, current consumption occurs and a delay time may occur.

When the LSB data is input, the memory device 100 may move the data from the cache latch QC to the second latch Q2, and may be SLC-programmed in a memory block corresponding to an address designated by the second latch Q2. The memory device 100 may program the CSB data and the MSB data in the same method.

Meanwhile, the memory device 100 may perform an initialize operation and a de-initialize operation for performing the program operation in each of three SLC program operations. For example, the initialize operation may be an operation of operating a pump or correcting a code through temperature measurement, and the de-initialize operation may be an operation of discharging the bit line BL or the word line WL and stopping the pump.

Since the memory device 100 repeatedly performs the status read polling operation, the data input, the initialize operation, and the de-initialize operation in each of the SLC program operations, a waste of emergency power and a program time may occur in a sudden power off situation.

Figure 7:
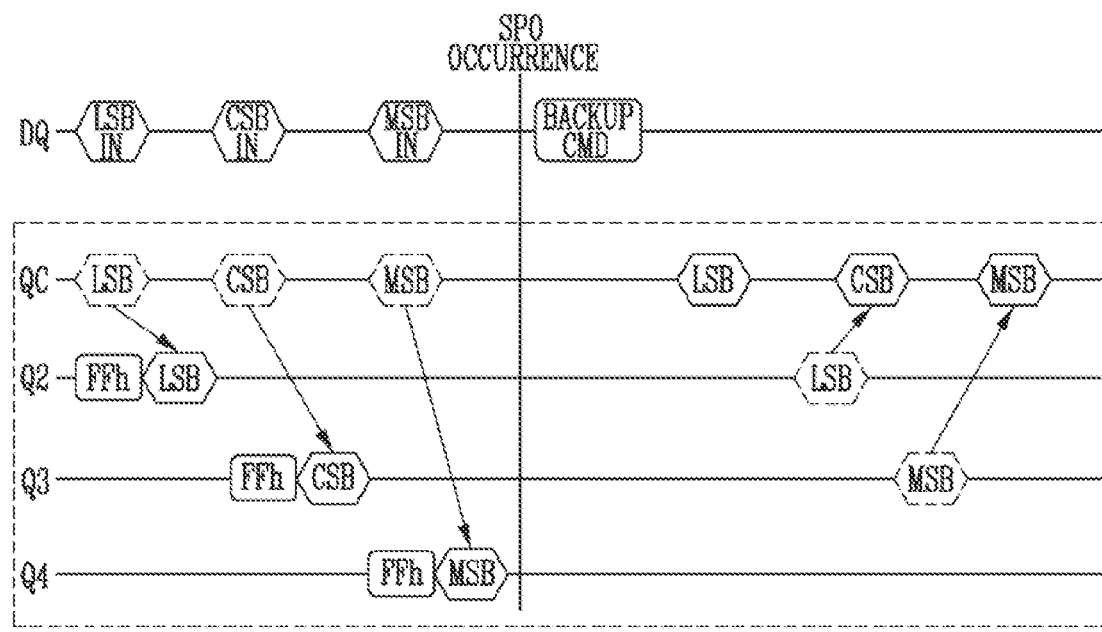
FIG. 7 is a diagram illustrating a backup program operation according to an embodiment of the present disclosure.

FIG. 7 is a diagram illustrating a backup program operation according to an embodiment of the present disclosure.

Referring to FIG. 7, an operation of the memory device 100 of a case where the sudden power off occurs during the TLC program operation is shown. First, the memory device 100 may sequentially receive the LSB data, the CSB data, and the MSB data. In the memory device 100, the received data may be first temporarily stored in a cache latch QC, the LSB data may be stored in a second latch Q2, the CSB data may be stored in a third latch Q3, and the MSB data may be stored in a fourth latch Q4.

In addition, when the sudden power off occurs during a program, the memory controller 200 may transmit the backup command for stopping the program operation that is being performed to the memory device 100. In response to the backup command, the memory device 100 may perform the reset operation of stopping the program operation that is being performed and resetting the peripheral circuit 120 and the like. However, apart from that shown FIG. 6, in response to the backup command, the memory device 100 might not reset values of the cache latch QC, the second latch Q2, the third latch Q3, and the fourth latch Q4.

Sometimes, the memory controller 200 may perform the SLC program operation after retransmitting the data stored in the buffer memory or the like to the memory device 100. However, according to the present disclosure, since the page buffer is not initialized, the memory device 100 and the memory controller 200 might not require a status read polling operation retransmission of data for retransmitting the data. In addition, the memory device 100 and the memory controller 200 may prevent power consumption and a time delay in a status read polling operation and data retransmission process.

In addition, the memory device 100 may store the LSB data buffered in the second latch Q2 in the backup block. The memory device 100 may also move the CSB data and the MSB data buffered in the third latch Q3 and the fourth latch Q4 to the second latch Q2 and program the CSB data and the MSB data in the same method.

Meanwhile, according to an embodiment of the present disclosure, the memory device 100 may omit an initialize operation and a de-initialize operation for performing the program operation in each of three SLC program operations. For example, the memory device 100 may perform an initialize operation only before performing the backup program of the LSB data, and the memory device 100 may perform a de-initialize operation only after performing the backup program of the CSB data.

Meanwhile, according to an embodiment of the present disclosure, the memory device 100 may perform the backup program operation by omitting a verify operation in each SLC program operation. The threshold voltage of the memory cell may be easily formed in the SLC program operation compared to the TLC or QLC program operation. Therefore, the memory device 100 may omit a verify operation or a verify period for verifying a program state in each program loop. The memory device 100 may prevent waste of emergency power and a program time in a sudden power off situation by performing the backup program operation including only a pulse operation or a pulse period for applying the program voltage.

Figure 8:
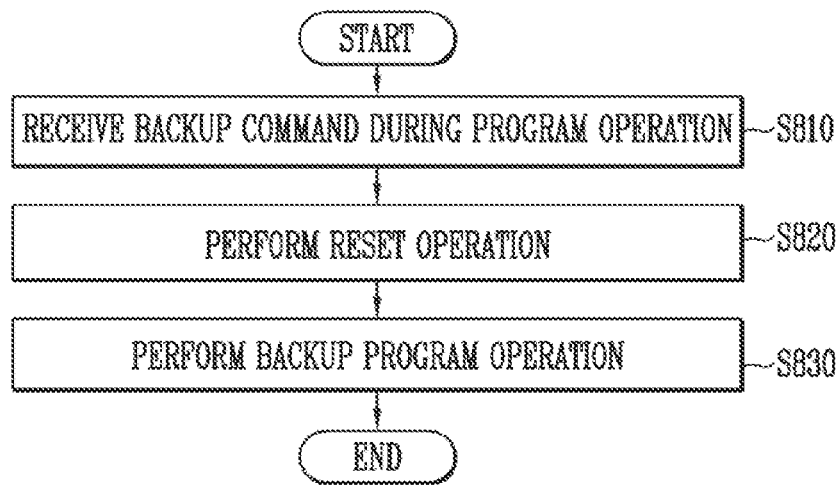
FIG. 8 is a flowchart illustrating a method of operating a memory device according to an embodiment of the present disclosure.

FIG. 8 is a flowchart illustrating a method of operating a memory device according to an embodiment of the present disclosure.

The memory device 100 may receive the backup command during the program operation (S810). For example, when the sudden power off occurs, the memory controller 200 may transmit the backup command indicating the occurrence of the sudden power off to the memory device 100.

The memory device 100 may perform the reset operation in response to the backup command (S820). For example, in response to the backup command received from the memory controller 200, the memory device 100 may perform the reset operation of stopping the program operation that is being performed.

In addition, the memory device 100 may control the page buffer group 131 to maintain the state in which the data is buffered in the page buffer group 131 while the reset operation is performed. For example, the memory device 100 may store all of the LSB data, the CSB data, and the MSB data in the page buffer group 131 while the reset operation is performed. That is, in response to the backup command, the memory device 100 might not initialize the page buffer group 131, initialize the remains except for the page buffer group 131, and stop the program operation that is in progress.

The memory device 100 may perform the backup program operation in response to the backup command (S830). For example, in response to the backup command received from the memory controller 200, the memory device 100 may perform the backup program operation for backing up data on which the program operation is performed. The memory device 100 may program the memory cell in the SLC that stores one bit of data as the backup program operation. The SLC program operation is a program operation that stores one bit of data. Since a program speed of the SLC program operation is faster than a program speed of the TLC or the CLC, the memory device 100 may perform the SLC program operation having a high program speed and lower power consumption as the preliminary operation or the backup operation for the sudden power off.

In addition, the memory device 100 may perform the backup program operation corresponding to the program operation that is in progress. For example, when the program operation that is in progress is the TLC program operation of storing three bits of data, the memory device 100 may perform the SLC program operation three times.

Meanwhile, according to an embodiment of the present disclosure, the memory device 100 may generate the backup operation information in response to the backup command. Here, the backup operation information may include information indicating whether the backup operation is performed, information indicating whether the sudden power off is generated, information on data that is a target of the backup program operation, information indicating whether the backup program operation is performed, and the like. In addition, the memory device 100 may store the backup operation information in the backup block together with the data of the program stopped during the backup program operation. In addition, when the external power voltage is normally supplied thereafter, the memory controller 200 may identify that the sudden power off is generated or that the backup operation is performed with reference to the backup operation information received from the memory device 100.

Figure 9:
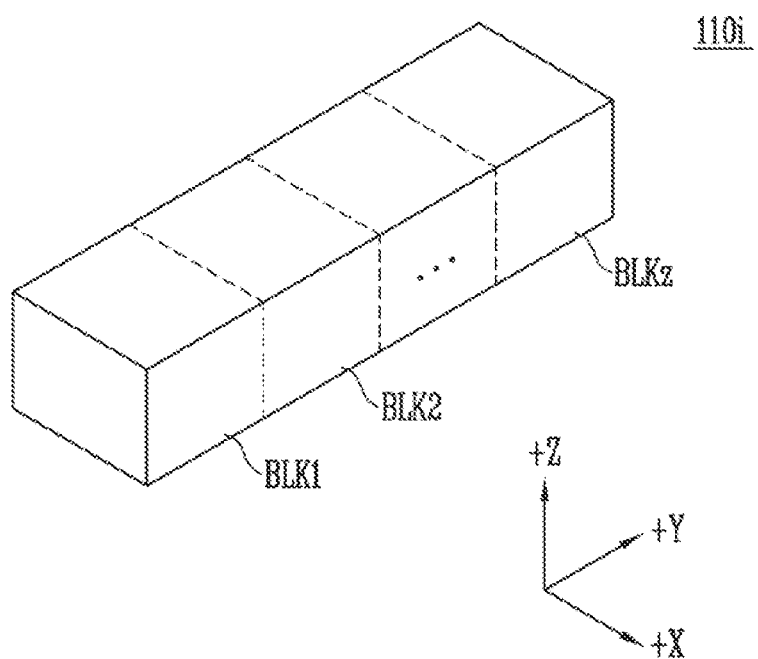
FIG. 9 is a diagram illustrating a memory cell array according to an embodiment of the present disclosure.

FIG. 9 is a diagram illustrating a memory cell array according to an embodiment of the present disclosure.

Referring to FIG. 9, the memory cell array 110*i* may include a plurality of memory blocks BLK1 to BLKz. Each memory block may be formed in a three-dimensional structure, and each memory block may include a plurality of memory cells stacked on a substrate. The plurality of memory cells may be arranged along a +X direction, a +Y direction, and a +Z direction. The structure of each memory block is described with reference to FIGS. 10 to 12.

Figure 10:
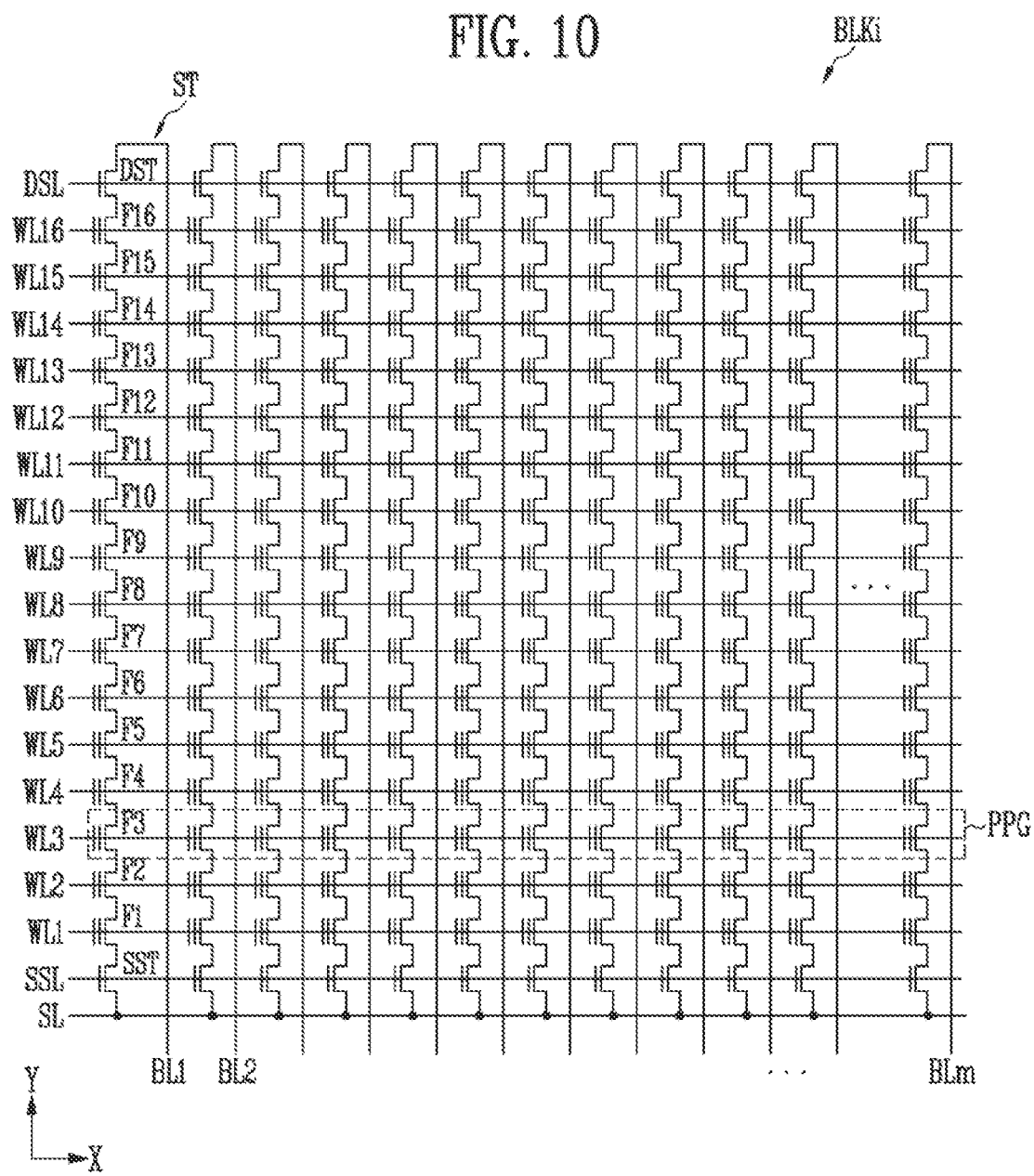
FIG. 10 is a diagram illustrating a structure of a memory block according to an embodiment of the present disclosure.

FIG. 10 is a diagram illustrating a structure of a memory block according to an embodiment of the present disclosure.

Referring to FIG. 10, in the memory block BLKi, a plurality of word lines arranged in parallel with each other may be connected between a first select line and a second select line. Here, the first select line may be a source select line SSL, and the second select line may be a drain select line DSL. for example, the memory block BLKi may include a plurality of strings ST connected between bit lines BL1 to BLm and a source line SL. The bit lines BL1 to BLm may be connected to the strings ST, respectively, and the source line SL may be commonly connected to the strings ST. Since the strings ST may be configured to be identical to each other, a string ST connected to the first bit line BL1 is for example described as an example.

The string ST lay include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include the memory cells MC1 to MC16 more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a physical page (PPG). Therefore, the memory block BLKi may include the physical pages (PPG) of the number of the word lines WL1 to WL16.

Each of the memory cells may be configured as the SLC that stores one data bit, the MLC that stores two data bits, the TLC that stores three data bits, or the QLC capable of storing four data bits.

The SLC may store one bit of data. One physical page (PPG) of the SLC may store one logical page (LPG) data. One logical page (LPG) data may include data bits corresponding to the number of cells included in one physical page (PPG).

The MLC, the TLC, and the QLC may store two or more bits of data. In this case, one physical page (PPG) may store two or more logical page (LPG) data.

Figure 11:
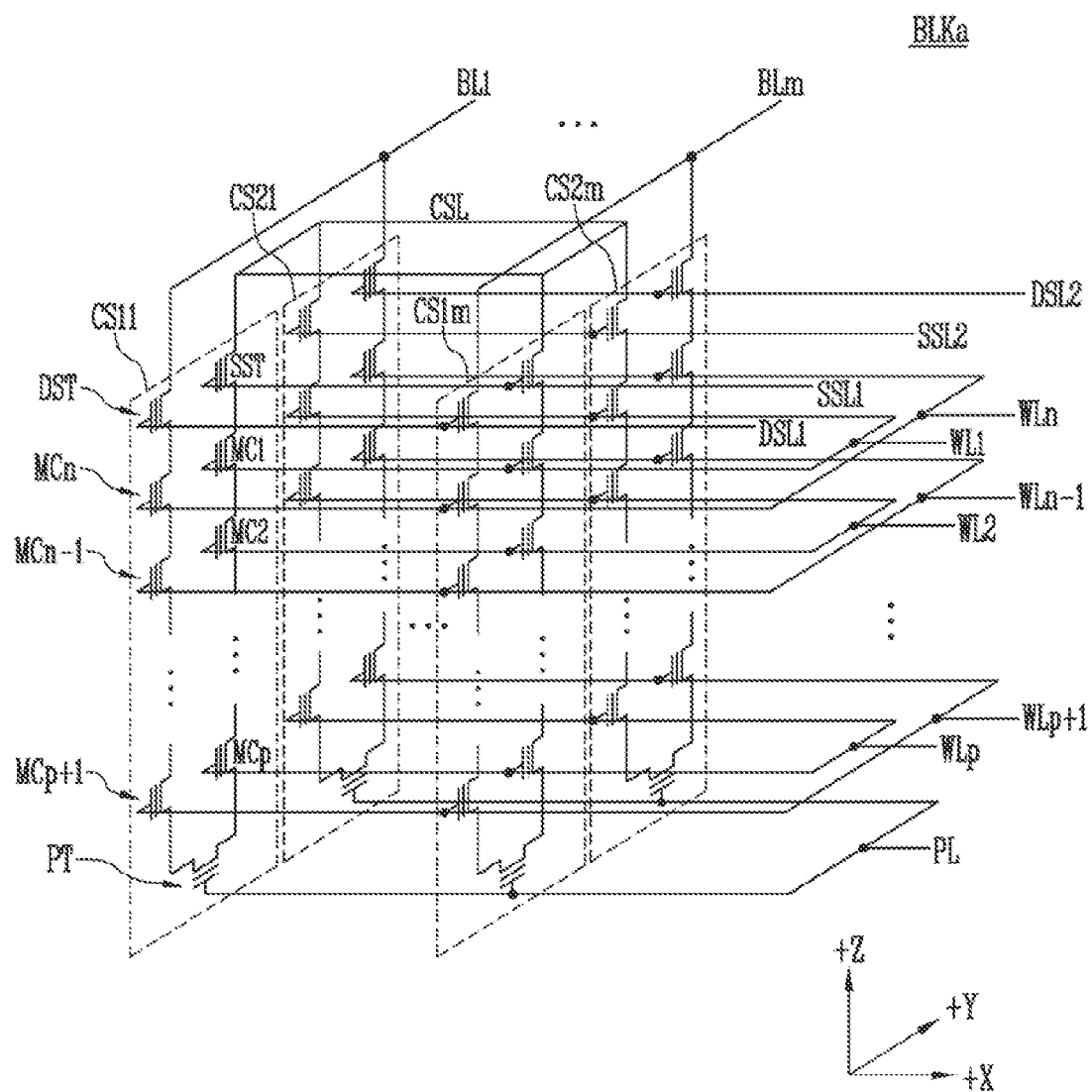
FIG. 11 is a diagram illustrating a memory block according to another embodiment of the present disclosure.

FIG. 11 is a diagram illustrating a memory block according to another embodiment of the present disclosure.

Referring to FIG. 11, any one memory block BLKa among the memory blocks BLK1 to BLKz of FIG. 9 is shown. The memory block BLKa may include a plurality of cell strings CS11 to CS1*m* and CS21 to CS2*m*. As an embodiment, each of the plurality of cell strings CS11 to CS1*m* and CS21 to CS2*m* may be formed in a 'U' shape. In the memory block BLKa, m cell strings may be arranged in a row direction (that is, the +X direction).

Meanwhile, in FIG. 11, two cell strings are arranged in a column direction (that is, the +Y direction), but this is for convenience of description, and it is obvious that three or more cell strings may be arranged in the column direction.

Each of the plurality of cell strings CS11 to CS1*m* and CS21 to CS2*m* may include at least one source select transistor SST, first to n-th memory cells MC1 to MCn, a pipe transistor PT, and at least one drain select transistor DST.

Each of the select transistors SST and DST and the memory cells MC1 to MCn may have a similar structure. As an embodiment, each of the select transistors SST and DST and the memory cells MC1 to MCn may include a channel layer, a tunneling insulating layer, a charge storage layer, and a blocking insulating layer. As an embodiment, a pillar for providing a channel layer may be provided in each cell string. As an embodiment, a pillar for providing at least one of the channel layer, the tunneling insulating layer, the charge storage layer, and the blocking insulating layer may be provided in each cell string.

The source select transistor SST of each cell string may be connected between a common source line CSL and memory cells MC1 to MCp.

As an embodiment, source select transistors of cell strings arranged in the same row may be connected to a source select line extending in the row direction, and source select transistors of cell strings arranged in different rows may be connected to different source select lines. Referring to FIG. 11, source select transistors of cell strings CS11 to CS1m of a first row are connected to a first source select line SSL1. Source select transistors of cell strings CS21 to CS2m of a second row are connected to a second source select line SSL2.

As another embodiment, the source select transistors of the cell strings CS11 to CS1m and CS21 to CS2m may be commonly connected to one source select line.

The first to n-th memory cells MC1 to MCn of each cell string may be connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp may be sequentially arranged in a direction reverse to the +Z direction, and may be connected between the source select transistor SST and the pipe transistor PT in series. The (p+1)-th to n-th memory cells MCp+1 to MCn may be sequentially arranged in the +Z direction, and may be connected between the pipe transistor PT and the drain select transistor DST in series. The first to p-th memory cells MC1 to MCp and the (p+1)-th to n-th memory cells MCp+1 to MCn may be connected through the pipe transistor PT. Gates of the first to n-th memory cells MC1 to MCn of each cell string may be connected to first to n-th word lines WL1 to WLn, respectively.

A gate of the pipe transistor PT of each cell string may be connected to a pipe line PL.

The drain select transistor DST of each cell string is connected between a corresponding bit line and the memory cells MCp+1 to MCn. Cell strings arranged in the row direction may be connected to the drain select line extending in the row direction. Drain select transistors of the cell strings CS11 to CS1m of the first row may be connected to a first drain select line DSL1. Drain select transistors of the cell strings CS21 to CS2m of the second row may be connected to a second drain select line DSL2.

Cell strings arranged in the column direction may be connected to bit lines extending in the column direction. Referring to FIG. 4, the cell strings CS11 and CS21 of a first column are connected to the first bit line BL1. The cell strings CS1m and CS2m of an m-th column may be connected to the m-th bit line BLm.

Memory cells connected to the same word line within the cell strings arranged in the row direction may configure one page. For example, the memory cells connected to the first word line WL1 among the cell strings CS11 to CS1m of the first row may configure one page. The memory cells connected to the first word line WL1 among the cell strings CS21 to CS2m of the second row may configure another page. The cell strings arranged in one row direction may be selected by selecting one of the drain select lines DSL1 and DSL2. In addition, one page among the selected cell strings may be selected by selecting any one of the word lines WL1 to WLn.

As another embodiment, even bit lines and odd bit lines may be provided instead of the first to m-th bit lines BL1 to BLm. In addition, even-numbered cell strings among the cell strings CS11 to CS1m or CS21 to CS2m arranged in the row direction may be connected to the even bit lines, respectively, and odd-numbered cell strings among the cell strings CS11 to CS1m or CS21 to CS2m arranged in the row direction may be connected to the odd bit lines, respectively.

As an embodiment, at least one or more of the first to n-th memory cells MC1 to MCn may be used as a dummy memory cell. For example, at least one or more dummy memory cells may be provided to reduce an electric field between the source select transistor SST and the memory cells MC1 to MCp. Alternatively, at least one or more dummy memory cells may be provided to reduce an electric field between the drain select transistor DST and the memory cells MCp+1 to MCn. As more dummy memory cells are provided, reliability of an operation for the memory block BLKa may be improved, but a size of the memory block BLKa may increase. As less memory cells are provided, the size of the memory block BLKa may decrease, but the reliability of the operation for the memory block BLKa may be reduced.

In order to efficiently control at least one or more dummy memory cells, each of the dummy memory cells may have a required threshold voltage. Before or after an erase operation on the memory block BLKa, program operations on all or some of the dummy memory cells may be performed. When the erase operation is performed after the program operation is performed, the dummy memory cells may have the required threshold voltage by controlling a voltage applied to dummy word lines connected to the respective dummy memory cells.

Figure 12:
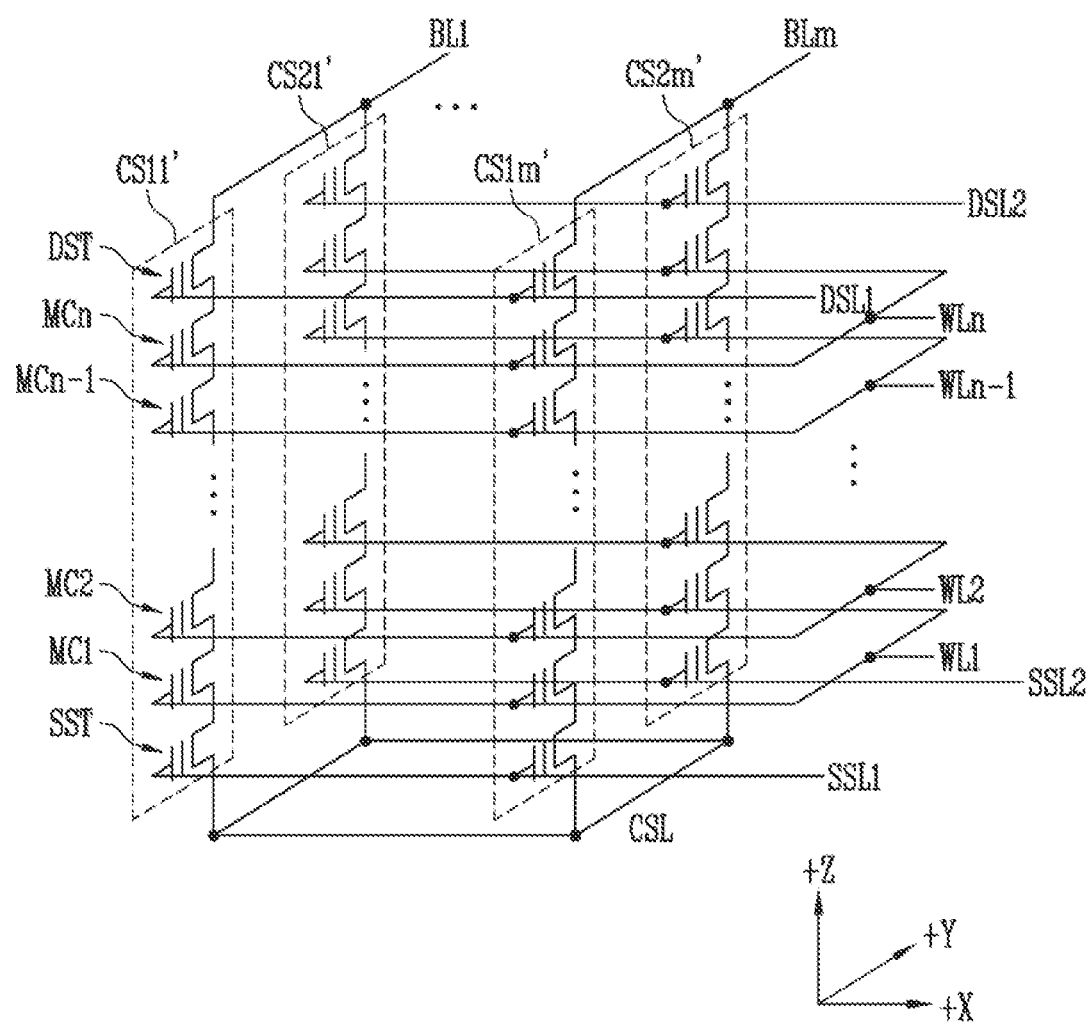
FIG. 12 is a diagram illustrating a memory block according to another embodiment of the present disclosure.

FIG. 12 is a diagram illustrating a memory block according to another embodiment of the present disclosure.

Referring to FIG. 12, another embodiment of a memory block BLKb among the memory blocks BLK1 to BLKz of FIG. 9 is shown. The memory block BLKb may include a plurality of cell strings CS11' to CS1m' and CS21' to CS2m'. Each of the plurality of cell strings CS11' to CS1m' and CS21' to CS2m' may extend along the +Z direction. Each of the plurality of cell strings CS11' to CS1m' and CS21' to CS2m' may include at least one source select transistor SST, first to n-th memory cells MC1 to MCn, and at least one drain select transistor DST, which are stacked on a substrate (not shown) under the memory block BLK1'.

The source select transistor SST of each cell string may be connected between the common source line CSL and the memory cells MC1 to MCn, Source select transistors of cell strings arranged in the same row may be connected to the same source select line. Source select transistors of cell strings CS11' to CS1m' arranged in the first row may be connected to the first source select line SSL1. Source select transistors of the cell strings CS21' to CS2m' arranged in the second row may be connected to the second source select line SSL2. As another embodiment, the source select transistors of the cell strings CS11' to CS1m' and CS21' to CS2m' may be commonly connected to one source select line.

The first to n-th memory cells MC1 to MCn of each cell string may be connected between the source select transistor SST and the drain select transistor DST in series. The gates of the first to n-th memory cells MC1 to MCn may be connected to the first to n-th word lines WL1 to WLn, respectively.

The drain select transistor DST of each cell string may be connected between a corresponding bit line and the memory cells MC1 to MCn. The drain select transistors of the cell strings arranged in the row direction may be connected to the drain select line extending in the row direction. The drain select transistors of the cell strings CS11' to CS1m' of the first row may be connected to the first drain select line DSL1. The drain select transistors of the cell strings CS21' to CS2m' of the second row may be connected to the second drain select line DSL2.

As a result, the memory block BLKb of FIG. 5 may have an equivalent circuit similar to that of the memory block BLKa of FIG. 12 except that the pipe transistor PT is excluded from each cell string.

As another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to the even bit lines, respectively, and odd-numbered cell strings among the cell strings CS11' to CS1m' or CS21' to CS2m' arranged in the row direction may be connected to the odd bit lines, respectively.

As an embodiment, at least one or more of the first to n-th memory cells MC1 to MCn may be used as a dummy memory cell. For example, at least one or more dummy memory cells may be provided to reduce an electric field between the source select transistor SST and the memory cells MC1 to MCn. Alternatively, at least one or more dummy memory cells may be provided to reduce an electric field between the drain select transistor DST and the memory cells MC1 to MCn. As more dummy memory cells are provided, reliability of an operation for the memory block BLKb may be improved, but a size of the memory block BLKb may increase. As less memory cells are provided, the size of the memory block BLKb may decrease, but the reliability of the operation for the memory block BLKb may be reduced.

In order to efficiently control at least one or more dummy memory cells, each of the dummy memory cells may have a required threshold voltage. Before or after an erase operation on the memory block BLKb, program operations on all or some of the dummy memory cells may be performed. When the erase operation is performed after the program operation is performed, the dummy memory cells may have the required threshold voltage by controlling a voltage applied to dummy word lines connected to the respective dummy memory cells.

Figure 13:
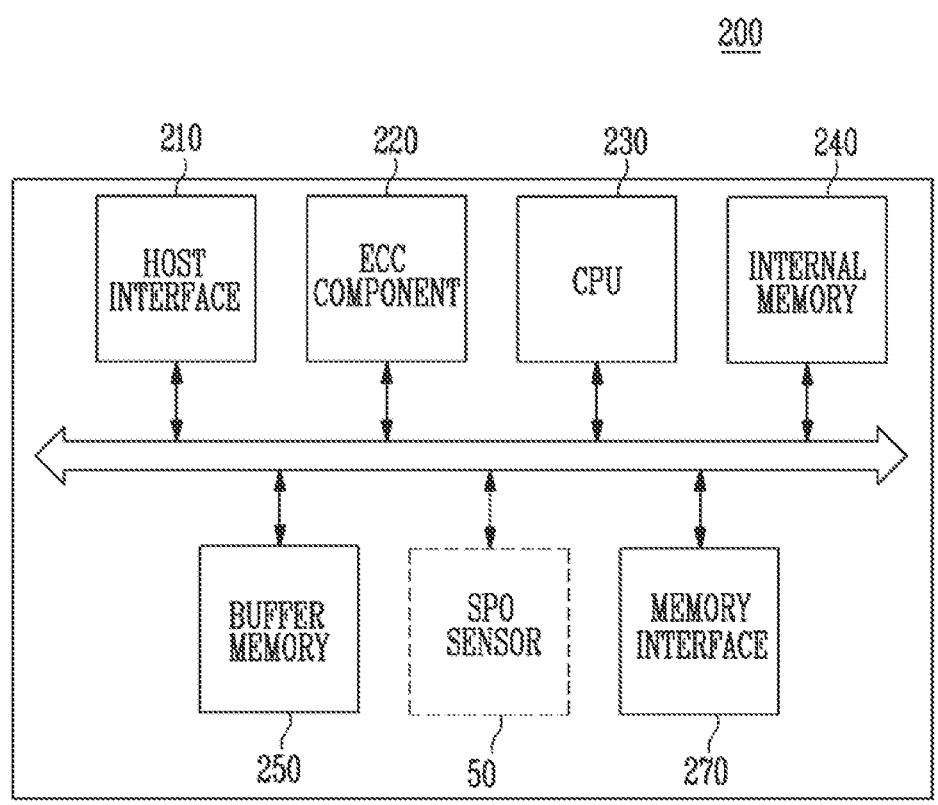
FIG. 13 is a block diagram illustrating a memory controller according to an embodiment of the present disclosure.

FIG. 13 is a block diagram illustrating a memory controller according to an embodiment of the present disclosure.

Referring to FIG. 13, the memory controller 200 may include a host interface 210, an ECC component 220, a CPU 230, an internal memory 240, a buffer memory 250, an SPO sensor 50, and a memory interface 270.

The host interface 210 may include a protocol for exchanging data between the host 2000 and the memory controller 200. For example, the host interface 210 may be configured to communicate with the host 2000 through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The ECC component 220 may detect an error during the program operation or the read operation and correct the detected error. For example, the ECC component 220 may perform an error correction operation according to an error correction code (ECC). In addition, the ECC component 220 may perform error correction encoding (ECC encoding) based on data to be written in the memory device 100. The data on which the error correction encoding is performed may be transferred to the memory device 100 through the memory interface 270. In addition, the ECC component 220 may perform error correction decoding on data received from the memory device 100 through the memory interface 270.

The CPU 230 may communicate with the host 2000 using the host interface 210 and perform a logical operation to control an operation of the memory controller 200. For example, the CPU 230 may load a program command, a data file, a data structure, and the like, perform various operations, or generate a command and an address, based on a request received from the host 2000 or an external device. For example, the CPU 230 may generate various commands necessary for the program operation, the read operation, the erase operation, a suspend operation, and a parameter setting operation.

In addition, the CPU 230 may perform a function of a flash translation layer (FTL). The CPU 230 may convert a logical block address (LBA) provided by the host into a physical block address (PBA) through the FTL. The FTL may receive the LBA using a mapping table and convert the LBA into the PBA. An address mapping method of the FTL may include various methods according to a mapping unit. A representative address mapping method includes a page mapping method, a block mapping method, and a hybrid mapping method.

In addition, the CPU 230 may generate a command without a request of the host 2000. For example, the CPU 230 may generate the command for background operations such as operations for wear leveling of the memory device 100 and operations for garbage collection of the memory device 100. According to an embodiment of the present disclosure, the CPU 230 may generate the backup command for controlling the memory device 100 to perform the backup operation when the sudden power off occurs. In addition, the CPU 230 may generate the resume command for resuming the stopped operation when power is input after the sudden power off occurs.

The internal memory 240 may be used as a storage for storing various pieces of information necessary for the operation of the memory controller 200. For example, the internal memory 240 may include a map table, and physical-logical address information and logical-physical address information may be stored in the map table. In addition, the internal memory 240 may be controlled by the CPU 230.

The buffer memory 250 may be used as an operation memory or a cache memory of the CPU 230. In addition, the buffer memory 250 may store codes and commands executed by the CPU 230. The buffer memory 250 may store data processed by the CPU 230. In addition, the buffer memory 250 may be implemented by including a static RAM (SRAM) or a dynamic RAM (DRAM) when the buffer memory 250 is implemented.

The memory interface 270 may communicate with the memory device 100 using a communication protocol under control of the CPU 230. For example, the memory interface 270 may communicate the command, the address, and the data with the memory device 100 through a channel.

The SPO sensor 50 may monitor power input from the outside. For example, the SPO sensor 50 may sense a case where the external power voltage is unexpectedly decreased or cut off by monitoring the input external power voltage. In addition, when the sudden power off is sensed, the SPO sensor 50 may notify the CPU 230 of the sudden power off. The CPU 230 may control the memory controller 200 to operate in an emergency mode in response to a sudden decrease or cut off of the external power voltage.

Figure 14:
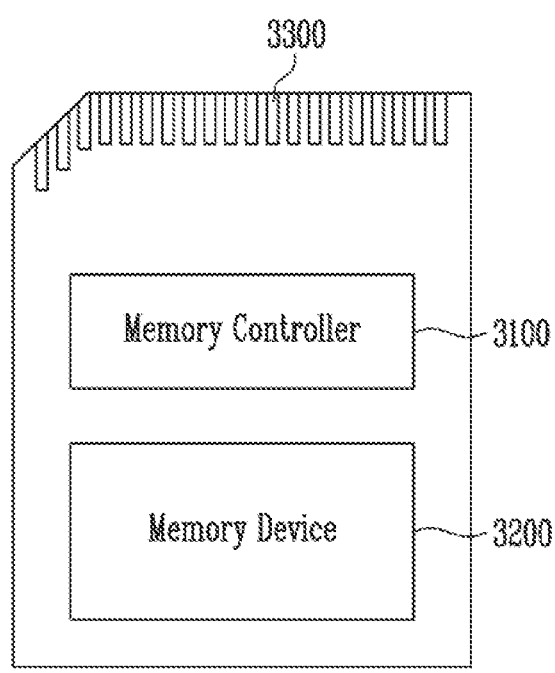
FIG. 14 is a diagram illustrating a memory card system according to an embodiment of the present disclosure.

FIG. 14 is a diagram illustrating a memory card system according to an embodiment of the present disclosure.

Referring to FIG. 14, the memory card system 3000 may include a memory controller 3100, a memory device 3200, and a connector 3300.

The memory controller 3100 may be electrically connected to the memory device 3200, and the memory controller 3100 may be configured to access the memory device 3200. For example, the memory controller 3100 may be configured to control a read operation, a write operation, an erase operation, and a background operation for the memory device 3200. The memory controller 3100 may be configured to provide an interface between the memory device 3200 and a host. In addition, the memory controller 3100 may drive firmware for controlling the memory device 3200.

For example, the memory controller 3100 may include components such as a random access memory (RAM), a processor, a host interface, a memory interface, and an error correction circuit.

The memory controller 3100 may communicate with an external device through the connector 3300. The memory controller 3100 may communicate with an external device (for example, the host) according to a specific communication standard. For example, the memory controller 3100 may be configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS). Wi-Fi, Bluetooth, and an NVMe. For example, the connector 3300 may be defined by at least one of the various communication standards described above.

For example, the memory device 3200 may be implemented as various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 3100 and the memory device 3200 may be integrated into one semiconductor device to configure a memory card. For example, the memory controller 3100 and the memory device 3200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 15:
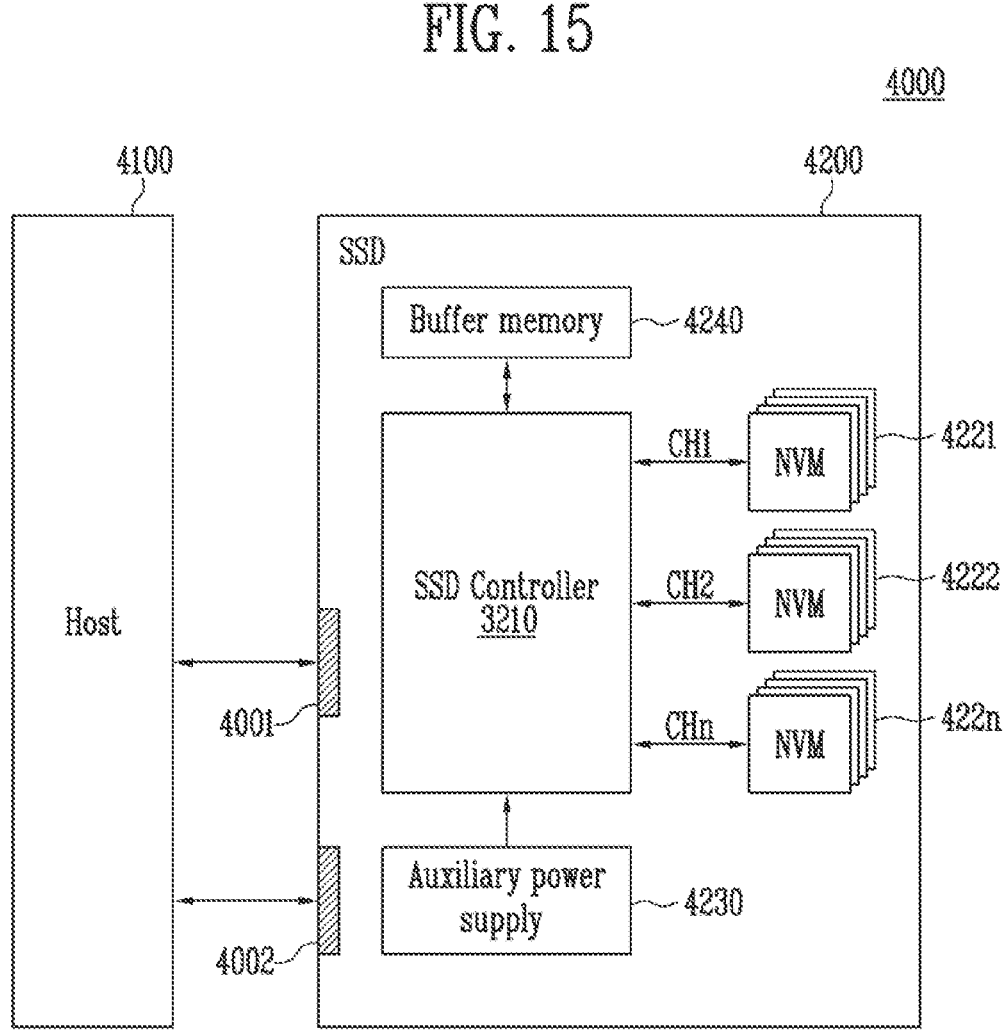
FIG. 15 is a diagram illustrating a solid state drive (SSD) system according to an embodiment of the present disclosure.

FIG. 15 is a diagram illustrating a solid state drive (SSD) system according to an embodiment of the present disclosure.

Referring to FIG. 15, the SSD system 4000 may include a host 4100 and an SSD 4200. The SSD 4200 may exchange a signal SIG with the host 4100 through a signal connector 4001 and receive power PWR through a power connector 4002. The SSD 4200 may include an SSD controller 4210, a plurality of flash memories 4221 to 422n, an auxiliary power device 4230, and a buffer memory 4240.

In an embodiment, the SSD controller 4210 may perform a function of the memory controller 200 described with reference to FIG. 1. The SSD controller 4210 may control the plurality of flash memories 4221 to 422n in response to the signal SIG received from the host 4100. For example, the signal SIG may be signals based on an interface between the host 4100 and the SSD 4200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS). Wi-Fi, Bluetooth, and an NVMe.

The auxiliary power device 4230 may be connected to the host 4100 through the power connector 4002. The auxiliary power device 4230 may receive the power PWR from the host 4100 and may charge the power. The auxiliary power device 4230 may provide power of the SSD 4200 when power supply from the host 4100 is not smooth. For example, the auxiliary power device 4230 may be positioned in the SSD 4200 or may be positioned outside the SSD 4200. For example, the auxiliary power device 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of flash memories 4221 to 422n, or may temporarily store metadata (for example, a mapping table) of the flash memories 4221 to 422n. The buffer memory 4240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

FIG. 16 is a diagram illustrating a user system according to an embodiment of the present disclosure.

Referring to FIG. 16, the user system 5000 may include an application processor 5100, a memory module 5200, a network module 5300, a storage module 5400, and a user interface 5500.

The application processor 5100 may drive components, an operating system (OS), a user program, or the like included in the user system 5000. For example, the application processor 5100 may include controllers, interfaces, graphics engines, and the like that control the components included in the user system 5000. The application processor 5100 may be provided as a system-on-chip (SoC).

The memory module 5200 may operate as a main memory, an operation memory, a buffer memory, or a cache memory of the user system 5000. The memory module 5200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 5100 and memory module 5200 may be packaged based on a package on package (POP) and provided as one semiconductor package.

The network module 5300 may communicate with external devices. For example, the network module 5300 may support wireless communication such as code division multiple access (CDMA), global system for mobile communications (GSM), wideband CDMA (WCDMA), CDMA- 2000, time division multiple access (TDMA), long term evolution, Wimax, WLAN, UWB, Bluetooth, and WI-FI. For example, the network module 5300 may be included in the application processor 5100.

The storage module 5400 may store data. For example, the storage module 5400 may store data received from the application processor 5100. Alternatively, the storage module 5400 may transmit data stored in the storage module 5400 to the application processor 5100. For example, the storage module 5400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 5400 may be provided as a removable storage device (removable drive), such as a memory card, and an external drive of the user system 5000.

For example, the storage module 5400 may include a plurality of non-volatile memory devices, and the plurality of non-volatile memory devices may operate identically to the memory device described with reference to FIGS. 1 to 13. The storage module 5400 may operate identically to the memory system 1000 described with reference to FIG. 1.

The user interface 5500 may include interfaces for inputting data or an instruction to the application processor 5100 or for outputting data to an external device. For example, the user interface 5500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 5500 may include user output interfaces such as a liquid crystal display (LCD), an organic light emitting diode (OLED) display device, an active matrix OLED (AMOLED) display device, an LED, a speaker, and a monitor.

Although the detailed description of the present disclosure describes specific embodiments, various changes and modifications may be made without departing from the scope and technical spirit of the present disclosure. Therefore, the scope of the present disclosure should not be limited to the above-described embodiments, and should be determined by the equivalents of the claims of the present disclosure as well as the following claims.

What is claimed is:

1. A memory device comprising:
    a memory cell array including a backup block and a data block;
    a data input and output (input/output) circuit including a plurality of page buffers that buffer data received from a host;
    a peripheral circuit configured to perform a program operation of storing the data in the data block; and
    a backup operation controller configured to control the peripheral circuit to perform a reset operation of stopping the program operation and a backup program operation of storing the data in the backup block when a backup command indicating occurrence of a sudden power off is received from an external controller during the program operation,
    wherein the reset operation is an operation of maintaining a state in which the data is buffered during the program operation in the plurality of page buffers and resetting the peripheral circuit except for the plurality of page buffers.

2. The memory device of claim 1, wherein the backup operation controller comprises a backup information generator that generates backup operation information indicating whether the backup program operation is performed, in response to the backup command.

3. The memory device of claim 2, wherein the backup operation controller controls the peripheral circuit to store the data and the backup operation information in the backup block during the backup program operation.

4. The memory device of claim 1, wherein the backup operation controller controls the peripheral circuit to perform a backup read operation of reading the data stored in the backup block in response to a resume command for restarting the program operation from the external controller, store the read data in memory cells corresponding to an address included in the resume command, and perform a backup erase operation erasing the backup block.

5. The memory device of claim 1, wherein each of the memory cells included in the data block is programmed in any one of a triple level cell (TLC) storing three bits of data or a quad level cell (QLC) storing four bits of data.

6. The memory device of claim 1, wherein each of the memory cells included in the backup block is programmed in a single level cell (SLC) storing one bit of data.

7. The memory device of claim 1, wherein the backup program controller controls the peripheral circuit to store the data in pages corresponding to the number of a plurality of logical pages included in the data among a plurality of pages included in the backup block during the backup program operation.

8. The memory device of claim 1, wherein the backup program controller controls the peripheral circuit so as not to perform a verify operation during the backup program operation.

9. The memory device of claim 1, wherein the data includes least significant bit (LSB) data, central significant bit (CSB) data, and most significant bit (MSB) data.

10. A method of operating a memory device including a backup block and a data block, the method comprising:
    receiving a backup command indicating occurrence of a sudden power off during a program operation of storing data received from an outside in the data block;
    performing a reset operation of maintaining a state in which the data is buffered during the program operation in a plurality of page buffers and resetting a peripheral circuit that performs the program operation except for the page buffers; and
    performing a backup program operation of storing the data in the backup block.

11. The method of claim 10, wherein performing the backup program operation comprises generating backup operation information indicating that the data is stored in the backup block.

12. The method of claim 11, wherein performing the backup program operation comprises storing the data and the backup operation information in the backup block.

13. The method of claim 10, further comprising:
    receiving a resume command instructing to restart the program operation;
    performing a backup read operation of reading the data stored in the backup block, in response to the resume command; and
    performing a backup erase operation of erasing the data stored in the backup block.

14. The method of claim 10, wherein each of the memory cells included in the data block is programmed in any one of a triple level cell (TLC) storing three bits of data or a quad level cell (QLC) storing four bits of data.

15. The method of claim 10, wherein each of the memory cells included in the backup block is programmed in a single level cell (SLC) storing one bit of data.

16. The method of claim 10, wherein performing the backup program operation comprises storing the data in pages corresponding to the number of logical pages included in the data among a plurality of pages included in the backup block.

17. The method of claim 10, wherein performing the backup program operation does not perform a verify operation.

18. A memory system comprising:
a memory device including a backup block and a data block; and
a memory controller configured to control the memory device,
wherein the memory controller comprises:
a sudden power off (SPO) sensor configured to monitor power input from an outside and sense occurrence of a SPO; and
a central processing unit (CPU) configured to generate a backup command instructing the memory device to store data stored in the data block in the backup block in response to the occurrence of the SPO,
the memory device performs a reset operation of stopping a program operation of storing the data in the data block and a backup program operation of storing the data corresponding to the program operation in the backup block when the backup command is received from the memory controller, and
the reset operation is an operation of maintaining the data and resetting the memory device except for at least one page buffer included in the memory device.

19. The memory system of claim 18, wherein the CPU generates a resume command for controlling the memory device to continue the program operation when the power is input after the occurrence of the SPO.

20. The memory system of claim 19, wherein when receiving the resume command from the memory controller, the memory device resumes the program operation after performing a backup read operation of reading the data stored in the backup block and a backup erase operation of erasing the data stored in the backup block.

* * * * *